(12) United States Patent
Chen

(10) Patent No.: US 6,757,090 B2
(45) Date of Patent: Jun. 29, 2004

(54) TRANSMISSION MECHANISM

(75) Inventor: Huang-kun Chen, Tao Yuan (TW)

(73) Assignee: Delta Electronics, Inc. (TW)

( * ) Notice: Subject to any disclaimer, the term of this patent is extended or adjusted under 35 U.S.C. 154(b) by 122 days.

(21) Appl. No.: 10/137,600

(22) Filed: May 1, 2002

(65) Prior Publication Data

US 2003/0107812 A1 Jun. 12, 2003

(30) Foreign Application Priority Data

Dec. 11, 2001 (TW) ........................................ 90130715 A

(51) Int. Cl.$^7$ ............................................. G02B 26/02
(52) U.S. Cl. ...................................... 359/236; 385/140
(58) Field of Search ................................ 359/223, 226, 359/236, 634, 872–877; 385/140

(56) References Cited

U.S. PATENT DOCUMENTS 4,167,306 A * 9/1979 Longland ................... 359/876
5,177,644 A * 1/1993 Stark .......................... 359/896

* cited by examiner

Primary Examiner—Mark A. Robinson
Assistant Examiner—Alessandro Amari
(74) Attorney, Agent, or Firm—Martine & Penilla, LLP

(57) ABSTRACT

A transmission mechanism for an optical device is provided to change an angle of an optical element. The transmission mechanism includes a first member and a second member. The first member has a slanted surface and is capable of sliding back and forth along a first direction. The second member has a first part and a second part. The first part is contacted with the slanted surface of the first member. The second part has one end connected with the first part and the other end connected to the optical element. When the first member moves, the first part contacting the slant surface moves relative to the slanted surface, thereby causing the second part to rotate so as to change the angle of the optical element.

11 Claims, 3 Drawing Sheets

TRANSMISSION MECHANISM

BACKGROUND OF THE INVENTION

1. Field of the invention

The invention relates to a transmission mechanism and, more particularly to a transmission mechanism capable of changing an angle of an optical element.

2. Description of the Related Art

In a variable optical attenuator (VOA) or a tunable filter, a transmission mechanism is often used to adjust the inclined angle of an optical element such as a flat glass or a filter so as to obtain different refracting offsets or wavelengths.

Referring to FIG. 1, a conventional transmission mechanism 2 includes a lead screw 203, a moving member 204 and an arm 205. The lead screw 203 is driven by a stepping motor 201 so that the lead screw 203 moves by way of its threads. As shown in FIG. 2, since the moving member 204 is telescoped onto the lead screw 203, the moving member 204 also moves on the base 202 when the stepping motor 201 drives the lead screw 203 to move. In addition, a roller 214 is provided at one end of the moving member 204, a slot 215 is formed in the arm 205, and the roller 214 can slide back and forth along the slot 215. Therefore, when the moving member 204 moves, the roller 214 at one end of the moving member 204 slides along the slot 215 so as to rotate the arm 205. Accordingly, the filter 3 connecting to one end of the arm 205 also rotates. When the filter 3 rotates to a specified angle, the light having a different central wavelength output from the collimators 4 can be filtered due to the angle variation of the filter 3.

If the arm is made longer, the angle variation of the optical element such as a filter becomes smaller. That is, it is possible to finely adjust the transmission mechanism so as to improve the resolution thereof. However, when the arm is made longer, the volume of the transmission mechanism is also greater. In this case, such optical products cannot meet the requirement of light, thin, short and small tendency.

Although the pitch of the lead screw can be decreased to shorten the moving distance of the moving member and reduce the angle variation of the optical element, this way will greatly increase the manufacturing difficulty and the manufacturing costs.

Accordingly, it is an important subject of the invention to increase the resolution of the transmission mechanism and decrease the volume thereof.

SUMMARY OF THE INVENTION

In view of the above-mentioned subject, it is therefore an objective of the invention to provide a transmission mechanism with a high resolution and a small volume.

To achieve the above-mentioned objective, the transmission mechanism of the invention is provided in an optical device for changing an angle of an optical element. The transmission mechanism includes a first member and a second member. The first member has a slanted surface and is capable of sliding back and forth along a first direction. An angle between a normal direction of the slanted surface and the first direction is constant and not a 90-degree angle. The second member has a first part and a second part. The first part is contacted with the slanted surface of the first member. The second part is connected to the optical element. When the first member moves, the first part contacting the slanted surface moves relative to the slanted surface, thereby causing the second part to rotate so as to change the angle of the optical element.

When the first member moves, the first part of the second member moves relative to the slanted surface so as to change the angle of the optical element. On the basis of the geometric relationship between the first member and the second member, the minimum rotation angle of the optical element can be made very small. That is, it is possible to finely adjust the optical element so as to increase the resolution of the transmission mechanism and to greatly reduce the overall volume of the transmission mechanism.

DETAILED DESCRIPTION OF THE PREFERRED EMBODIMENT

Figure 1:
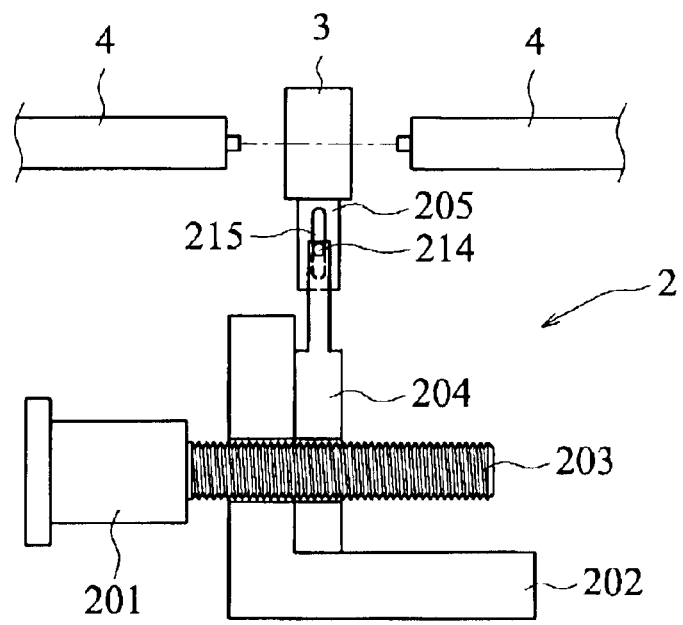
FIG. 1 is a schematic illustration showing a conventional transmission mechanism.
Figure 2:
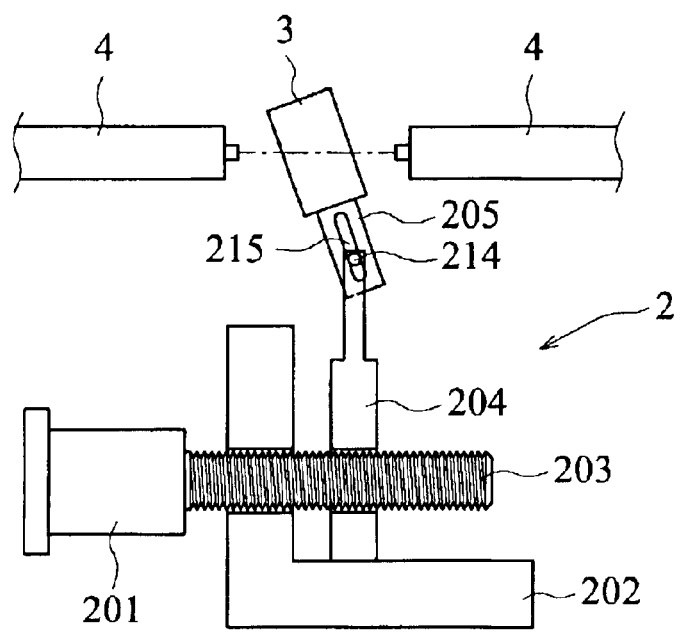
FIG. 2 is a schematic illustration showing the inclined optical element in the conventional transmission mechanism.
Figure 3:
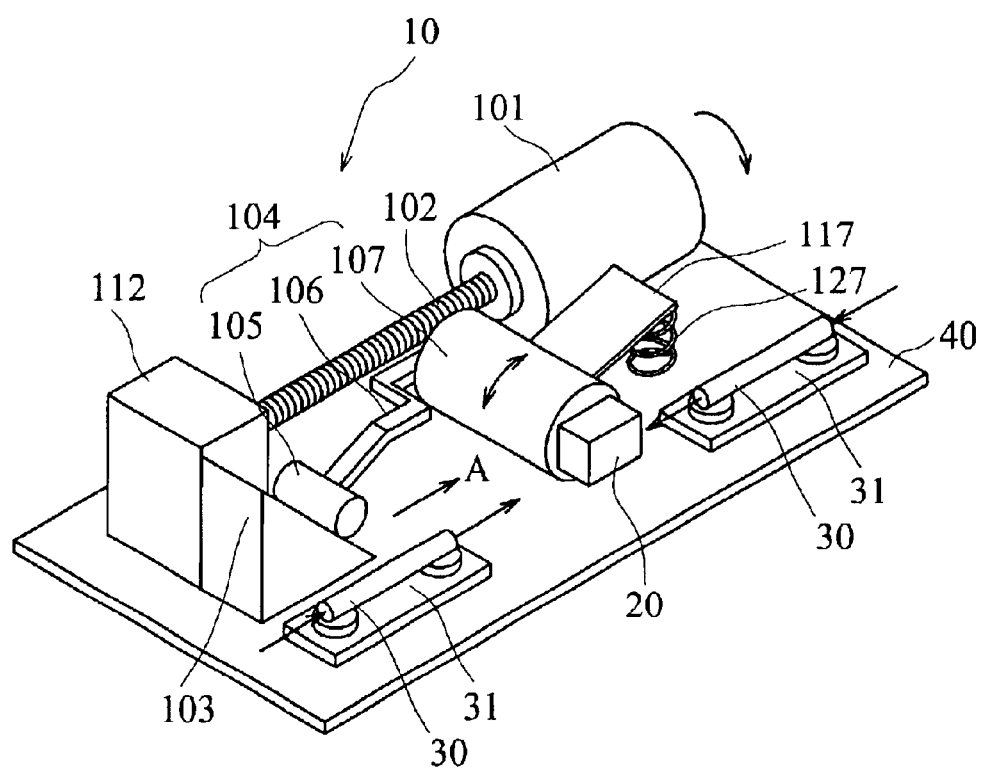
FIG. 3 is a perspective view showing a transmission mechanism of the invention.

As shown in FIG. 3, a transmission mechanism 10 in accordance with a preferred embodiment of the invention is mounted in an optical device 1. The transmission mechanism 10 includes a guiding member 102, a first member 103 and a second member 104. The guiding member 102 may be a lead screw with threads and is driven by an actuator 101 such as a stepping motor. When the actuator 101 drives the guiding member 102, the guiding member 102 rotates and moves back and forth by way of its threads. According to the right-hand rule, when the actuator 101 drives the guiding member 102 to rotate, the guiding member 102 moves in a first direction, i.e., direction A. In addition, a connection block 112 attached to one end of the guiding member 102 is also driven to move along with direction A.

In this embodiment, the first member 103 may be a slope slide with a slanted surface, wherein an angle between the normal direction of the slanted surface and direction A is constant but not a 90-degree angle. Since the first member 103 is connected to the connection block 112, the first member 103 moves with the movement of the connection block 112 along the direction A. It should be noted that the moving direction of the first member 103 is parallel to the axial direction of the guiding member 102.

The second member 104 includes a first part and a second part. The first part has a rolling member 105, which may be a roller made of glass and in contact with the slanted surface of the first member 103. The second part includes an arm 106 and a rotating part 107. The arm 106 has one end connecting to the rolling member 105, and the other end pivotally connected with the rotating part 107. The other end of the rotating part 107 is connected to an optical element 20 such as a filter or glass.

Figure 4:
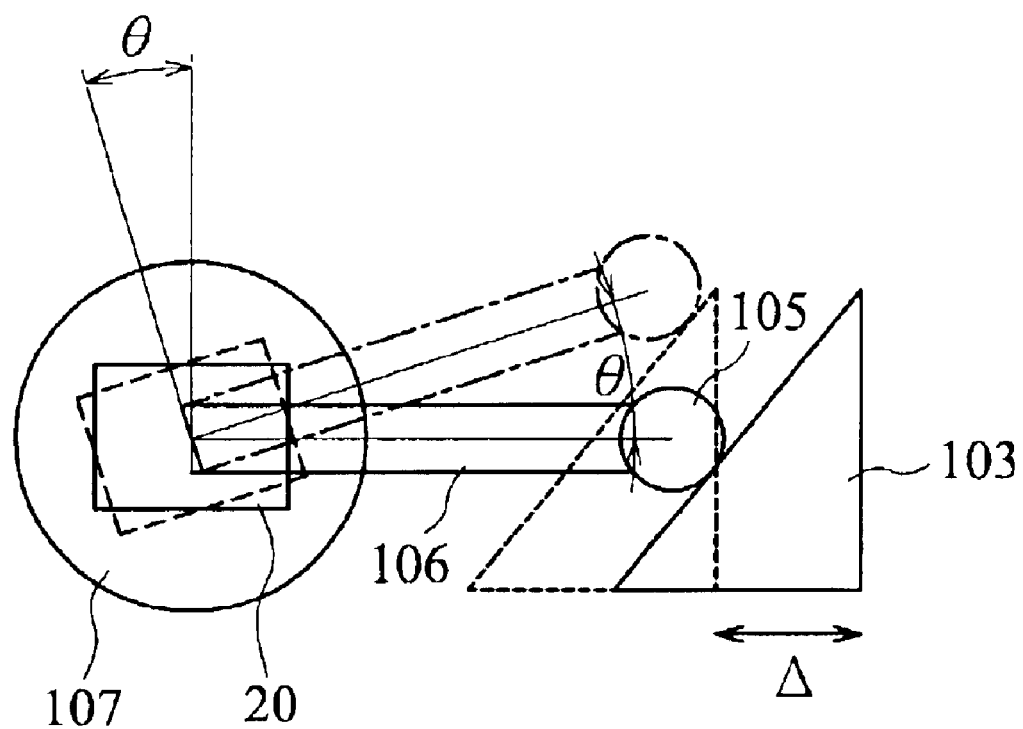
FIG. 4 is a schematic illustration showing the interaction between the main members in the transmission mechanism of the invention.

As shown in FIG. 4, when the first member 103 is moved by a distance of $\Delta$, the rolling member 105 rolls against the slanted surface of the first member 103. In order to reduce the friction force between the rolling member 105 and the slanted surface of the first member 103, both of the rolling member 105 and the slanted surface of the first member 103 may be made of glass so as to reduce the friction coefficient between the rolling member 105 and the slanted surface of the first member 103.

In addition, when the first member 103 slides to a distance of Δ, the rolling member 105 contacting the slanted surface of the first member 103 rotates with respect to the slanted surface and drives the arm 106 to rotate to an angle of θ. Since the arm 106 has one end connecting to the rolling member 105 and the other end connecting to the rotating part 107, the rotating part 107 also rotates correspondingly when the arm 106 rotates to a specified angle. Furthermore, since the optical element 20 such as a filter is attached to one end of the rotating part 107, the optical element 20 also rotates to an angle of θ when the rotating part 107 rotates to an angle of θ.

A reciprocating member 117 is connected to one side of the rotating part 107, and the reciprocating member 117 includes an elastic member 127, such as a spring, connecting to a base plate 40. Accordingly, when the first member moves back and forth along the direction A, the rotating part 107 also rotates. At this time, the reciprocating member 117 applies an oppositely elastic force to the reciprocating member 117 so as to keep the rolling member 105 to be in contact with the first member 103.

Collimators 30 may be mounted on the base 31 at two sides of the optical element 20 of the optical device 1. The collimators 30 provide light beams to be incident to the optical element 20. Then, changing the angle of the optical element 20 by the transmission mechanism 10, it is possible to obtain different offsets or to filter different wavelengths.

As stated above, when the first member 103 moves, the optical element 20 rotates correspondingly to different inclined angles. In this embodiment, since the moving direction of the first member 103 is parallel to the axial direction of the guiding member 102, the overall volume can be greatly reduced.

In addition, it is also possible to change the resolution by changing either the inclined angle of the slanted surface of the first member 103 or the length of the arm 106 according to the geometric relationship in the transmission mechanism 10 of this embodiment. For example, when the length of the arm 106 is constant and the angle between the base plate and the slanted surface of the first member 103 decreases, the rotation angle of the optical element 20 also decreases during the movement of the first member 103. In other words, the resolution for the product is increased. If the first member 103 and the second member 104 are made in proper sizes, the volume of the transmission mechanism 10 can be further reduced while maintaining the high resolution.

While the invention has been described by way of an example and in terms of a preferred embodiment, it is to be understood that the invention is not limited to the disclosed embodiment. To the contrary, it is intended to cover various modifications. Therefore, the scope of the appended claims should be accorded the broadest interpretation so as to encompass all such modifications.

What is claimed is:

1. A transmission mechanism for an optical device to change an angle of an optical element, comprising:

a first member having a slanted surface and being capable of sliding back and forth along a first direction; and a second member having a first part and a second part, the first part contacting the slanted surface of the first member, the second part being connected to the optical element, wherein when the first member moves, the first part contacting the slanted surface moves relative to the slanted surface, thereby causing the second part to rotate so as to change the angle of the optical element, and wherein the second part of the second member includes a rotating part connected to the optical element, and an arm having one end pivotally connected with the rotating part and the other end connected to the first part of the second member.

2. The transmission mechanism according to claim 1, wherein an angle between a normal direction of the slanted surface and the first direction is constant and not a 90-degree angle.

3. The transmission mechanism according to claim 1, further comprising:

an actuator; and a guiding member driven by the actuator to guide the first member to move along the first direction.

4. The transmission mechanism according to claim 3, wherein the actuator is a stepping motor.

5. The transmission mechanism according to claim 3, wherein the guiding member is a lead screw.

6. The transmission mechanism according to claim 5, wherein the first member moves along the first direction parallel to an axial direction of the lead screw.

7. The transmission mechanism according to claim 1, wherein the first part of the second member is a rolling member.

8. The transmission mechanism according to claim 7, wherein the rolling member is a roller.

9. The transmission mechanism according to claim 7, wherein the rolling member is made of glass.

10. The transmission mechanism according to claim 1, wherein the slanted surface of the first member is made of glass.

11. The transmission mechanism according to claim 1, further comprising:

a reciprocating member connecting to the second member so as to keep the first part in contact with the slanted surface when the first member moves back and forth along the first direction.

* * * * *